Jan. 22, 1952         G. B. ELLIS         2,582,973

SEALING MEANS FOR PRIMARY ALKALINE DRY CELLS

Filed Dec. 4, 1950

INVENTOR.
GRENVILLE B. ELLIS
BY
*Harry M. Saragovitz*
Attorney

Patented Jan. 22, 1952

2,582,973

UNITED STATES PATENT OFFICE 2,582,973

SEALING MEANS FOR PRIMARY ALKALINE DRY CELLS

Grenville B. Ellis, Red Bank, N. J., assignor to the United States of America as represented by the Secretary of the Army Application December 4, 1950, Serial No. 199,117

1 Claim. (Cl. 136—133)

(Granted under the act of March 3, 1883, as amended April 30, 1928; 370 O. G. 757)

The invention described herein may be manufactured and used by or for the Government for governmental purposes, without the payment of any royalty thereon.

This invention relates to primary cells and more particularly to sealing means for primary alkaline dry type cells.

As is known the moisture proof and air tight enclosure of primary alkaline dry cells is of great importance for their continued proper performance. At the same time such enclosure should offer good electrical and chemical insulation of the anodic and cathodic materials. Otherwise there is a possibility of internal short circuits being set up between the anodic and cathodic elements of the cell and the container, thus materially shortening the life of the cell and reducing its effective electromotive force.

It is an object of this invention to provide improved sealing means for an hermetically sealed dry type alkaline dry cell.

A dry cell embodying this invention comprises the usual anodic and cathodic elements formed of powder, paste or rolls. These elements are inserted into a tubular plastic container or housing and separated from each other by an ionically conductive barrier. Metal caps are fitted over the open ends of the tubular housing and are spot welded to the end cover plates. An hermetically tight closure is accomplished by crimping or pinching operations in which the sides of the metal caps are pinched or crimped into the plastic casing, forming retentive annular grooves somewhat the same as a bottle cap. In lieu of the metal covers, the active materials may be contained in metal cups. To insure the cell against the leakage of the electrolyte, gasket material may be packed between the tubular housing and the sides of the metal caps. This closure arrangement eliminates the use of sealing compounds previously used which are subject to many defects. It also provides a tight seal regardless of temperature conditions, and in conjunction with the electrical insulating quantities of the plastic tubular housing effectively prevents internal short circuits from being set up between the elements of the cell and the container. A further advantage is that such cell is less expensive to manufacture than cells using sealing compounds or other complicated sealing means.

Other objects, novel features and advantages of this invention will be apparent from the following specification and drawing wherein.

Figure 1:
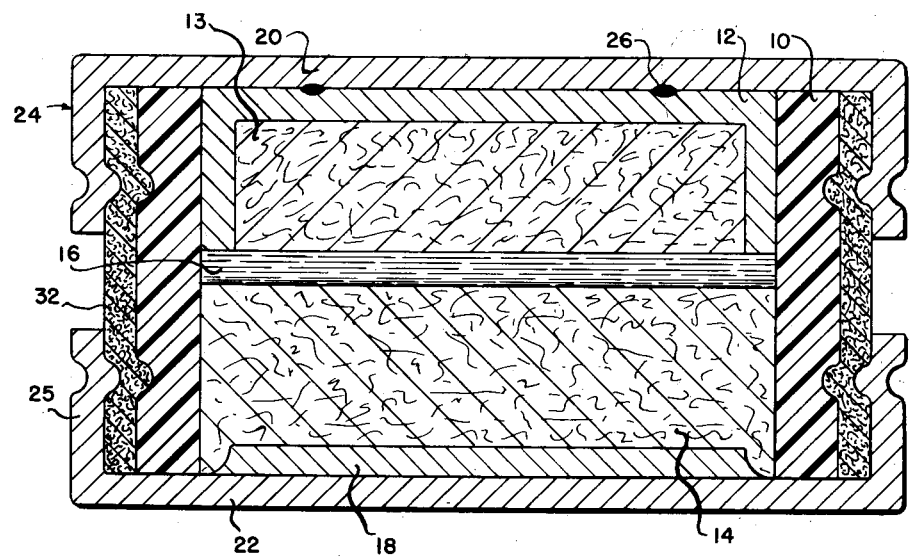
Fig. 1 is a sectional view of a cell embodying one form of the present invention.

Referring now to Fig. 1 the cell consists of a tubular container 10 of plastic dielectric material such as polystyrene, methyl-methacrylate, ethyl cellulose, nylon and other synthetic high polymers conventionally used for such purposes. A metal cup 12 within housing 10, consisting of steel or other conductive material, containing an electronically conductive mass 13 of oxygen yielding compounds such as mercuric-oxide, silver-oxide or the like form the cathodic elements of the cell. Anode 14 consisting of amalgamated zinc in roll or powdered form comprises the anodic element in the cell. Anode 14 is compressably maintained against a barrier 16 by metal cover 18 consisting of copper or other conductive metal.

Ionically conductive barrier 16, consisting as is well known, of a material which will allow rapid ionic flow, but prevent the flow of impurities from the depolarizer to the anode, separates anodic material 14 from cathodic material 13.

Plastic tubular housing 10 is sealed at the cathode end by metal cap 20 and at the anode end by metal cap 22 which in this embodiment consists of steel and copper respectively, but may be of any similarly conductive metals. Flange 24 of metal cap 20 extends well below the open end of tubular housing 10, long enough to make a tight fit against the sides of housing 10. The base of metal cap 20 is spot welded to cup 12 at 26 to provide good electrical contact between the cathodic material and surface of metal cap 20. Annular flange 24 is then crimped or pinched against the outer surface of plastic housing 10 to fasten cap 20 to the housing, thus providing an air tight seal between the cap and the housing. To further insure a gas tight seal, gasket or grommet material 32 is disposed around tubular housing 10 between the outer surface of housing 10 and the inner surface of flanges 24 and 25. Similarly metal cap 22 is sealed to the anode end of housing 10 and may or may not be spot welded to cover plate 18 depending on the degree of electrical contact desired. Flange 25, similar to flange 24 extends along the outer wall of container 10 a sufficient length to make a tight fit with the outer wall, but short enough so as not to be in electrical contact with the end of the flange 24. Thus, the anodic and cathodic materials, compressably maintained against barrier 16 are effectively sealed within housing 10 by metal caps 20, 22, protecting the internal elements of the cell against varying temperature conditions, rough usage and any tendency of the electrolyte to leak around the edges.

Figure 2:
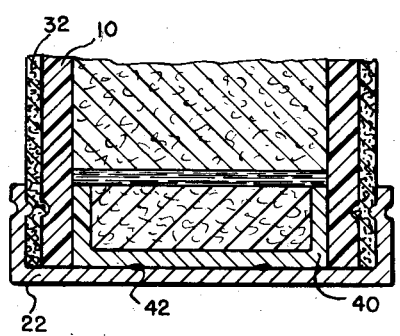
Fig. 2 is a sectional view showing a modified form using a metal cup as a container for the anodic material.
Figure 3:
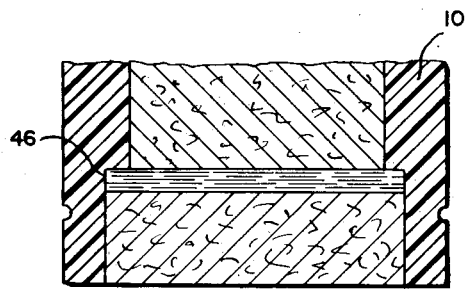
Fig. 3 is a further modification of Fig. 1.

Referring now to Fig. 2 there is shown metal cup 40, similar to metal cup 12 containing anodic material in paste form similar to the anodic material 14. In this embodiment both the anodic and cathodic materials of Fig. 1 are contained in similar metal cups each of which are spot welded at 26 and 42, to metal caps 20 and 22 respectively. Fig. 3 shows a modification of the internal structure of tubular housing 10 wherein housing 10 is internally stepped or ledged at 46 to provide a rigid resting place for barrier 16 and to decrease the possibility of leakage occurring around the edge of barrier 16.

It is to be understood that the term "cap" used herein is to be read as meaning a cover having a base and a side wall extending perpendicularly from the base. It is not essential that the base and side walls should be integral; they could be made as separate parts held closely together in the assembly. For instance, the base might be a flat plate spot welded to the anodic and cathodic cups or cover plates, and the side wall might be a circular ring crimped or pinched to the tubular housing at or near the base. In general, however, the integral construction will be found preferable.

What is claimed is:
In a leak proof primary alkaline dry cell having as internal elements a positive electrode, a negative electrode and an ionically conductive barrier between said electrodes, said positive electrode comprising a first metal cup completely filled with anodic material, said negative electrode comprising a second metal cup completely filled with cathodic material, an open ended plastic dielectric container, said internal elements being compressably maintained therein, a first metal cap, a second metal cap, said first metal cap completely covering one end of said housing, said second metal cap completely covering the other end of said housing, the base portion of said first cap being welded to the base portion of said first cup, the base portion of said second cap being welded to the base portion of said second cup, the side walls of said first and second metal caps being crimped or pinched against the outer wall of said container whereby said internal elements are hermetically sealed within said container.

GRENVILLE B. ELLIS.

REFERENCES CITED

The following references are of record in the file of this patent:

UNITED STATES PATENTS

| Number | Name | Date |
|---|---|---|
| 2,063,524 | Ruben | Dec. 8, 1936 |

OTHER REFERENCES

Transactions of Electrochemical Society, vol. 92, page 187, 1947.